(12) United States Patent
Mandal et al.

(10) Patent No.: US 11,868,934 B1
(45) Date of Patent: Jan. 9, 2024

(54) VIRTUAL FULFILLMENT CENTERS FOR ITEM DELIVERY

(71) Applicant: Amazon Technologies, Inc., Seattle, WA (US)

(72) Inventors: Jayanta Mandal, Bangalore (IN); Debasish Das, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 682 days.

(21) Appl. No.: 16/180,467

(22) Filed: Nov. 5, 2018

(51) Int. Cl.
| | |
|---|---|
| *G06Q 10/063* | (2023.01) |
| *G06Q 10/0631* | (2023.01) |
| *G05B 19/042* | (2006.01) |
| *G06Q 30/0601* | (2023.01) |
| *G06N 20/00* | (2019.01) |

(52) U.S. Cl.
CPC ..... *G06Q 10/06315* (2013.01); *G05B 19/042* (2013.01); *G06N 20/00* (2019.01); *G06Q 30/0633* (2013.01); *G05B 2219/25252* (2013.01); *G05B 2219/25257* (2013.01)

(58) Field of Classification Search
CPC ......... G06Q 10/06315; G06Q 30/0633; G06Q 10/063; G06N 20/00; G05B 19/042; G05B 2219/25252; G05B 2219/25257
See application file for complete search history.

(56) References Cited

U.S. PATENT DOCUMENTS

| | | | | |
|---|---|---|---|---|
| 2004/0088225 | A1* | 5/2004 | Foth | G06Q 30/06 705/26.41 |
| 2011/0153469 | A1* | 6/2011 | Mackenzie | G06Q 50/28 705/28 |
| 2015/0294262 | A1* | 10/2015 | Nelson | G06Q 10/083 705/330 |
| 2017/0323250 | A1* | 11/2017 | Lindbo | G06Q 30/0621 |
| 2020/0097900 | A1* | 3/2020 | Kibbey | G06F 16/212 |

OTHER PUBLICATIONS

Ricker, Fred R., & Kalakota, Ravi "Order Fulfillment: The Hidden Key to e-Commerce Success", 1999, Supply Chain Management Review, pp. 60-70 (Year: 1999).*

* cited by examiner

*Primary Examiner* — Jeff Zimmerman
*Assistant Examiner* — Wayne S. Murray
(74) *Attorney, Agent, or Firm* — Eversheds Sutherland (US) LLP

(57) ABSTRACT

Devices and methods are provided for using virtual fulfillment center locations to facilitate delivery of items. A device may receive a virtual location associated with transportation of an item to a first location. The device may determine a geographic zone associated with the virtual location. The device may determine a first delivery time associated with delivering the item from the first location, and determine a second delivery time associated with delivering the item from the virtual location. The device may receive a purchase request for the item, from a second device, wherein the purchase request is associated with delivery to a second location. The device may determine an estimated delivery date to the delivery location based on the first delivery time or the second delivery time. The device may send, to the second device, an indication of the estimated delivery date.

20 Claims, 6 Drawing Sheets

VIRTUAL FULFILLMENT CENTERS FOR ITEM DELIVERY

BACKGROUND

Because product delivery services may require time to transport goods in between locations, goods may be temporarily unavailable for purchase while they are in transit. In high-volume environments that rely on determining the real-time availability status of goods, it may be difficult to estimate accurately which goods are available and how long it may take to provide a good to a purchaser. Because the availability of goods and the estimated time to receive them may be important factors for a user in deciding whether to purchase a good, there is a need to more accurately represent the purchase availability of products while in transit and estimate their delivery time.

Figure 1:
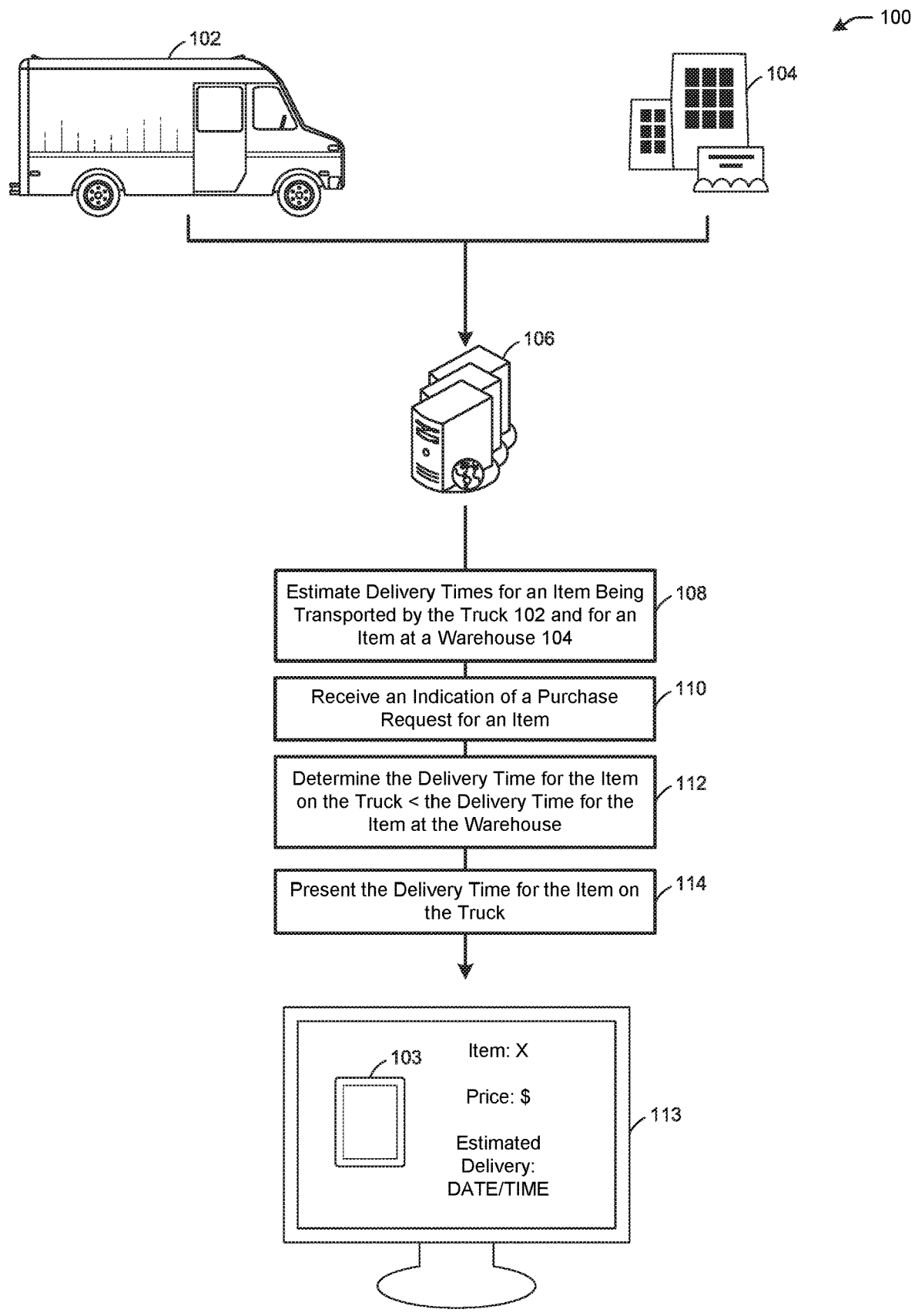
FIG. 1 illustrates an example process of determining optimal delivery based on virtual locations, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using virtual fulfillment centers in delivery of items. An electronic purchasing system may present goods available for purchase. When a user considers goods to purchase, the electronic purchasing system may provide indications of whether an item is in stock or not, and may provide estimates of when an item may be delivered to a buyer. To accurately determine the availability of items for purchase, the electronic purchasing system may benefit from distinguishing between items that are in stock and out of stock. However, an item need not be in a physical location (e.g., a fulfillment center) in order to be considered in stock and available for purchase. For example, an item may be in transport on its way to a buyer or returning from a buyer (e.g., if the buyer chooses to return an item). Rather than automatically considering such items out of stock and unavailable for purchase, the electronic purchasing system may identify when items in transit actually are available for purchase even before they are returned to a physical location, identified, and their availability status updated. This way, items in transit which otherwise may be considered out of stock may be more accurately identified as available for purchase, thereby increasing the number of available items for prospective purchasers.

When a purchaser considers an item for purchase, the electronic purchasing system may provide an estimated delivery time or date. The delivery time/date may be an important factor in a purchaser's decision whether to purchase an item. Rather than simply indicating that an out of stock (e.g., in transit) item is unavailable or providing an imprecise estimated delivery time based on a preset time that does not account for the real-time location of the item (e.g., a time from when the item reaches a physical location plus a buffer time for transportation back to the physical location), the electronic purchasing system may provide an accurate estimated delivery time which accounts for the real-time location of the item in transit, and considers whether the item even should be returned to a particular location before being transported to the purchaser.

To improve the accuracy and speed of the electronic purchasing system's ability to identify out of stock items and estimate their delivery times to a purchaser in real-time, the electronic purchasing system may use a virtual fulfillment center system. The use of the virtual fulfillment center may allow the electronic purchasing system to determine an estimated delivery time of an item in transit at the time of purchase with sufficient accuracy to guarantee a purchaser the shortest time possible for delivery. To guarantee a delivery time, it is essential to accurately account for transportation time of an item that is in transit at the time of its purchase. The virtual fulfillment center system may reduce transportation time and cost, as items in transit may be more quickly routed to a final destination than if they have to return to a physical location before they can be purchased and then sent out for delivery.

The virtual fulfillment center system may use geographic areas or zones (e.g., zip codes, pin codes, regions), etc. The areas and zones may use dynamic geo-tracking. For example, an estimated delivery time may be based on the areas and zones. The electronic purchasing system dynamically may adjust the estimated delivery time of an item being transported in a vehicle based on the geo-tracking of the location of the vehicle (e.g., based on which area or zone the transportation vehicle is traveling at a given time). Because the location of the item may be dynamic (e.g., changing while in transport), the estimated delivery time for the item may change dynamically. In addition, a moving vehicle transporting an item may be considered a virtual fulfillment center, so the virtual fulfillment center's location may be dynamic and may be associated with different areas/zones at a given time. This is different than, for example, estimating delivery time for an item that may be transported to multiple fixed locations because such estimations are preset (or adjusted slightly for traffic, environmental conditions, etc.) based on fixed distances. In contrast, the virtual fulfillment center system may have the ability to facilitate estimations of delivery times even when the location of an item is changing when a user purchases the item.

The electronic purchasing system may use the virtual fulfillment center system to optimize delivery time and cost for a purchaser. The virtual fulfillment center system may allow the electronic purchasing system to determine optimal transportation routes to reduce the delivery time and provide a purchaser with the shortest possible estimated delivery time. For example, the electronic purchasing system may determine whether it is more efficient to return a transported item to a fulfillment center before sending the item to a purchaser, or to bypass the fulfillment center (e.g., by sending the item to a sort center closer to a purchaser or by delivering the item from the vehicle without having to return to a physical location). Such may reduce delivery time and cost.

In a high-volume environment with many goods available for purchase, when a purchaser selects a good for purchase, there may be multiples of the particular good that may be delivered to the purchaser. One of the multiples may be coming from one location, and another of the multiples may be coming from another location. The electronic purchasing system may use the virtual fulfillment center system to determine which of the multiples to deliver to the purchaser and the estimated delivery time for the selected multiple. The selection of a multiple may be based on an optimal/shortest guaranteed delivery time. For example, one multiple of a good may be stored on a shelf in a warehouse, and another multiple of a good may be in transportation (e.g., because the multiple is being returned, its order has been cancelled before delivery, etc.). Rather than defaulting to a selection of the good which is in stock at a physical location, the shortest estimated delivery to a purchaser may be the multiple which is in transportation (e.g., out of stock). If the multiple in transportation may be more likely to be delivered to a purchaser than the multiple currently in stock in a warehouse, then the multiple in transportation may be selected as the one to be delivered to the purchaser, and the estimated delivery of the multiple in transport may be provided to the purchaser.

The areas/zones may be associated with units of time in order to determine dynamically an estimated delivery time of a moving item. For example, an item in an area/zone may be considered to take a specific number of days to reach a location in that area/zone or a location in another/area zone. Therefore, two items in the same area/zone may be considered to take the same amount of time for delivery to a location. Two items in the same/area zone may differ in delivery time based on their specific locations within the zone, or whether the items are located in a physical/static location or are in transportation at the time of purchase. For example, an item in transportation in physical/static location in an area/zone may be considered as taking the same time to deliver as a moving item in the same area/zone, or the delivery times of the respective items may be adjusted based on their real-time locations, whether the items are moving, etc.

The location of a virtual fulfillment center may be determined in real-time, for example, by using global navigation satellite systems, driver location inputs, etc. The location of a virtual fulfillment center may be determined using predictability based on, for example, historical transportation data. If historical transportation data indicates travel time between locations, along certain routes, between areas/zones, within areas/zones, etc., a location of a virtual fulfillment center may be estimated based on when and where an item is picked up by the virtual fulfillment center. If a transportation time may be estimated between locations, then based on an amount of time that an item has been in transport, the virtual fulfillment center system may facilitate the estimation of a delivery time that accounts for the transportation time.

One or more machine learning algorithms may be used to perform such estimation using historical transportation times. For example, an estimated delivery time of a purchased item being transported from one location to another may be a first time at a first purchase, but at a second later purchase the machine learning algorithm may adjust the estimated delivery time for a purchased item being transported between the same or similar locations. The machine learning algorithm may adjust routes between the same or similar locations to increase delivery efficiency and allow for the shortest estimated delivery time to be presented to a purchaser. Estimated delivery time and routes may be evaluated and adjusted based on various factors such as how many orders are fulfilled from virtual fulfillment centers, how much time maybe saved before an item gets inbounded, how much time is taken between inbounding items and stowing items, how much time is taken from an order drop to a vehicle to the item being dropped at a sort-center/delivery center, how much time is taken between an item being dropped at a sort-center/delivery center and being ready for customer shipment manifestation, etc.

Delivery times for items may be estimated periodically so that when a purchaser indicates an intent to purchase an item, the electronic purchasing system quickly may retrieve the estimated delivery time for the item. For example, if the delivery time for items is updated hourly or daily based on the respective locations of the items, the estimated delivery times may be stored and accessed by the electronic purchasing system to determine which item to deliver to a user and the respective estimated delivery time for the selected item to deliver. By periodically updating and storing estimated delivery times for items and accounting for virtual fulfillment centers, the estimated delivery times may be updated dynamically and may be provided quickly to a purchaser (e.g., more quickly than calculating the delivery time only after a purchase request is received).

When an item/inventory is picked up from a customer/seller location, the virtual fulfillment center system may stow the item virtually into a zone/isle/shelf/bin location of the virtual fulfillment center. An original destination fulfillment center for a shipment of the item is not disturbed and may be maintained as usual. The inventory/item may be visible in the electronic purchasing system so that item is available for purchase by customers. Virtual fulfillment centers may be created for areas/zones and may map to a set of pin-codes/zip-codes. When an item is picked up at a location (e.g., a location of a buyer returning the item), the item may be considered available for purchase even before the item returns to a physical location like a fulfillment center. The estimated delivery time from a physical fulfillment center or other physical, static location may be predetermined (or adjusted over time). Rather than waiting for the item to return to the physical location to start the clock on an estimated delivery, the virtual fulfillment center system may allow for estimating the additional time to return the item from the pick-up location to the physical location, and for estimating whether the item may be delivered faster to a purchaser without having to return to the physical location first. Conditions may be applied to determine whether an item may be delivered directly from a virtual fulfillment center. For example, a device on a virtual fulfillment center or associated with a driver or passenger of a virtual fulfillment center may capture and transmit image of a packaged item. The electronic purchasing system may receive the images and perform image analysis (e.g., computer-based image analysis techniques such as object recognition algorithms, including scale-invariant feature transform, deep neural networks, convolution neural networks, support vector machine, histogram of oriented gradients, etc.). The electronic purchasing system may determine that an item is properly packaged and may be delivered "as-is" from the virtual fulfillment center provided that other time and cost optimization parameters (e.g., shorter delivery time, cheaper delivery cost, etc.) also are satisfied.

When an item is checked-out by a customer then the customer location (e.g., pin-code/zip-code, etc.) and virtual fulfillment center current location (e.g., as dynamically mapped to a geo-location of the virtual fulfillment center) arc may be determined. The arc may be used by the electronic purchasing system estimated delivery to evaluate if a valid delivery promise may be offered or not. The virtual fulfillment center current location may be a dynamic position factor which may be included for the arc/path determination. If the dynamic position path/route "wins" (e.g., is the shortest/optimal route), a vehicle transporting an item may be routed to a nearest sort-center or delivery-center. A virtual fulfillment center current location may be mapped dynamically to a nearest sort-center or delivery-center to enable routing/drop-off. Sort-center/delivery-center may have web-based/mobile based systems to print relevant labels to continue regular delivery activity. When a vehicle reaches a physical fulfillment center as planned in an original shipment of an item, a transshipment from a virtual fulfillment center may be executed based on an inbounding process. During an inbounding process, there may be a lag where the items/inventory may not be not available to the buyers, and such time may be considered in the estimated delivery time.

The estimated delivery time may start at a default value (e.g., five days for virtual fulfillment), and the estimated delivery time may be reduced incrementally as the virtual fulfillment center moves closer to the physical fulfillment center. A virtual fulfillment center's current location may be mapped to a geo-location of a vehicle, and the location may refresh dynamically (e.g., every 30 minutes). The estimated delivery time may adjust based on the location, and the location may map dynamically to a nearest sort-center or delivery center for fulfillment request handling as needed.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 of determining optimal delivery based on virtual locations, in accordance with one or more example embodiments of the present disclosure.

Referring to FIG. 1, the process 100 may include a virtual fulfillment center 102, a physical (e.g., real, static) fulfillment center 104, and one or more servers 106. The virtual fulfillment center 102 may refer to a virtual location corresponding to a location of a vehicle at a given time. The virtual fulfillment center 102 may be in the process of picking up or transporting items (e.g., item 103) which may otherwise be considered out of stock (e.g., not accounted for at the physical fulfillment center 104. For example, items may be returned by buyers, or items may be on their way to a delivery address when a buyer cancels the delivery. The one or more servers 106 may be associated with an electronic purchasing system which may determine that an item is available for purchase when the item is being transported by the virtual fulfillment center 102 or when the virtual fulfillment center 102 is on the way to pick up an item that is being returned. The virtual fulfillment center 102 may be scheduled to transport items to the physical fulfillment center 104, where the items may be logged for inventory. The one or more servers 106 may collect location data for the virtual fulfillment center 102 and the physical fulfillment center 104.

At step 108, the location data at the one or more servers 106 may be used by the electronic purchasing system to estimate delivery times for the item 103 to be delivered from the virtual fulfillment center 102 (e.g., a delivery truck) and for the item 103 to be delivered from the physical fulfillment center 104 (e.g., a warehouse). The estimated delivery times may be based on predetermined geographic areas (e.g., zip codes, pin-codes, etc.). For example, delivery within a geographic area/zone may be determined to be one duration, and may be another duration when the item 103 is being delivered from one geographic area/zone to another. The delivery time from any one zone within that zone or to another zone may be constant respective to the zone of the delivery location regardless of where the delivery location may be within a zone or where the virtual fulfillment center 102 and/or physical fulfillment center 104 is within a zone. The electronic purchasing system may periodically update the estimated delivery times from the different locations.

At step 110, the electronic purchasing system, which may include a website or other application with which a user may indicate purchase selections of items, may receive an indication of a purchase request for one or more items (e.g., item 103). The purchase request may be received from another device or from a device on which the electronic purchasing system is operating. The one or more servers 106 may receive the purchase request, which may indicate a delivery address and any delivery instructions provided by a purchaser. The request may be a final confirmation to purchase or may be an intermediate purchasing step such as selecting items for a cart or list of items to potentially purchase. The delivery address may be located in a geographic area/zone from among multiple geographic areas/zones. A geographic area/zone may include one or more physical fulfillment centers (e.g., physical fulfillment center 104) and/or virtual fulfillment centers (e.g., virtual fulfillment center 102). It may be possible for a requested item to not be available (e.g., in stock) in any physical or virtual fulfillment center in the given geographic area/zone, in which case other fulfillment centers may be considered for delivery.

At step 112, the electronic purchasing system associated with the one or more servers 106 may determine the delivery times for the requested item from both the virtual fulfillment center 102 and the physical fulfillment center 104. If the delivery time from the virtual fulfillment center 102 (e.g., a delivery truck) is less than the delivery time from physical fulfillment center 104 (e.g., a warehouse), the virtual fulfillment center 102 may be selected for delivery of the item. Otherwise, the physical fulfillment center 104 may be selected for delivery of the item 103. To determine the estimated delivery times, optimal routes from the respective locations may be determined to the delivery location, and the shortest, fastest, and/or most cost-optimal route may be selected. If an item may be delivered from multiple fulfillment centers in the same geographic area/zone, then the estimated delivery times from each respective fulfillment center may be based on the individual routes, or may be considered the same time duration.

At step 114, the electronic purchasing system associated with the one or more servers 106 may present the estimated delivery time for an item based on the shortest estimated delivery time from a respective fulfillment center. For example, if the item 103 is available for delivery from the virtual fulfillment center 102 or the physical fulfillment center 104, the shortest estimated delivery time may be provided (e.g., presented on a display 113). If the virtual fulfillment center 102 and the physical fulfillment center 104 are in the same geographic area/zone, a default selection may be made regarding the starting point for the delivery of the selected item 103, or an optimal route based on the respective fulfillment center locations may determine from which fulfillment center the delivery of the item will originate. Presentation of the delivery time may be in addition to or in conjunction with other information such as the item 103, the purchase price, and other relevant information that may facilitate the purchase and/or provide purchase details.

Figure 2:
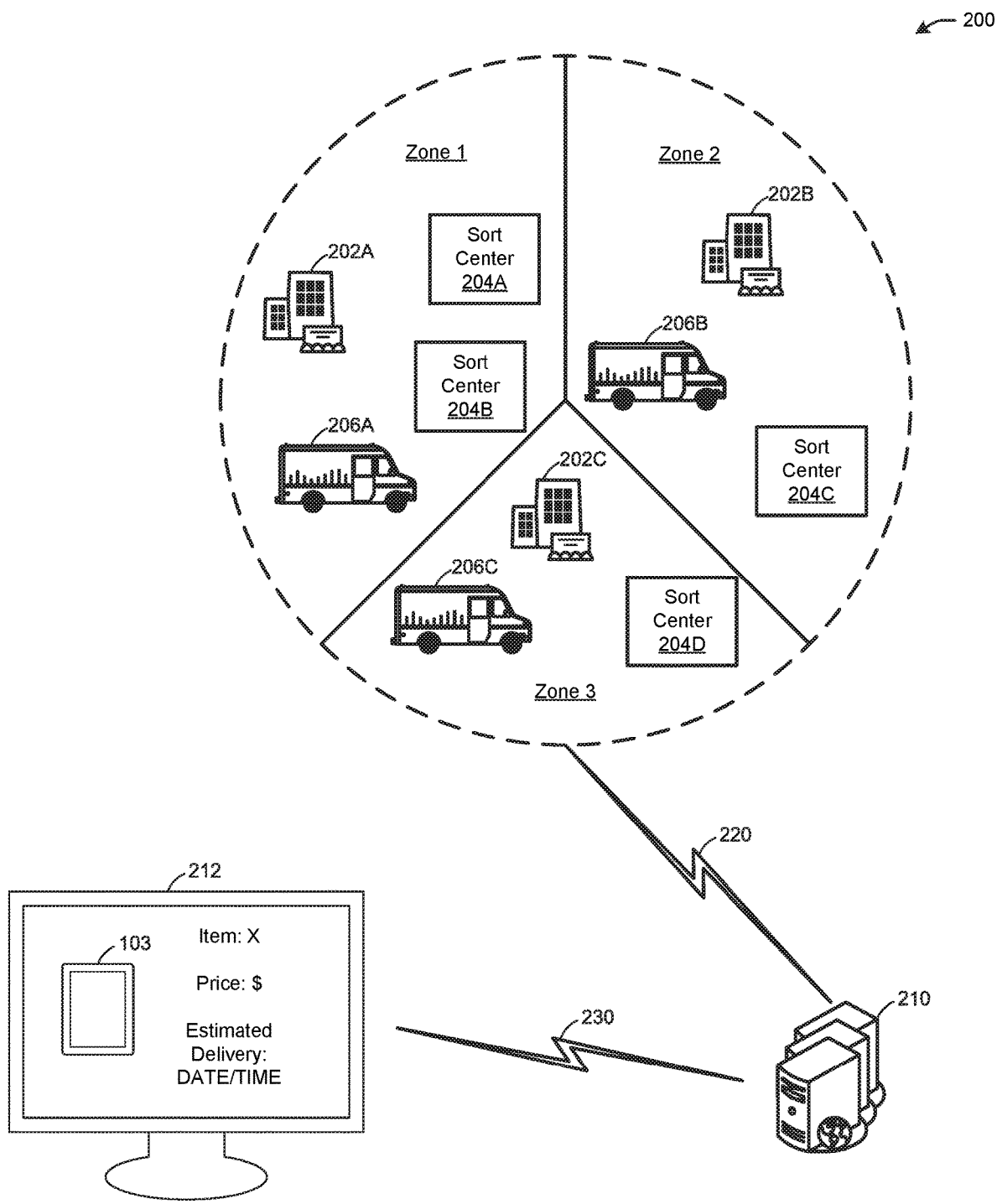
FIG. 2 illustrates a system for determining optimal delivery based on virtual locations, in accordance with one or more example embodiments of the present disclosure.

FIG. 2 illustrates a system 200 for determining optimal delivery based on virtual locations, in accordance with one or more example embodiments of the present disclosure.

Referring to FIG. 2, the system 200 may include a virtual fulfillment center/location system divided into geographic areas/zones (e.g., zone 1, zone 2, zone 3). Each zone may include one or more physical fulfillment centers, virtual fulfillment centers (e.g., delivery vehicles), and sort centers. For example, physical fulfillment center 202A may be located in zone 1, physical fulfillment center 202B may be located in zone 2, and physical fulfillment center 202C may be located in zone 3. Sort center 204A and sort center 204B may be located in zone 1. Sort center 204C may be located in zone 2. Sort center 204D may be located in zone 3. The sort centers also may refer to delivery centers. Virtual fulfillment center 206A may be located in zone 1. Virtual fulfillment center 206B may be located zone 2. Virtual fulfillment center 206C may be located zone 3.

Location data from the fulfillment centers may be provided at any given time to one or more servers 210 associated with an electronic purchasing system. For example, the physical fulfillment centers and the sort centers may be in known, static locations (e.g., they may be associated with physical structures such as buildings). The virtual fulfillment centers may have dynamic locations, however, because they may move (e.g., they may be vehicles). Items (e.g., item 103) stored in the physical fulfillment centers or the sort centers may be considered as available for purchase, so the one or more servers 210 may store data associated with items, their purchase availability, and their locations at any given time, along with other relevant information. The one or more servers 210 may provide data to a device 212 (e.g., any device with a display). The data may be presented by an application executing on the device 212. The device 212 may use one or more interfaces to display available item data, such as price, estimated delivery time, etc. Because the location data of an item may change at any time, the estimated delivery time/date of an item may be different at any time, so the estimated time data provide to the device 212 may change dynamically based on an item may be available for delivery at a given time.

Estimated delivery time may be based on time increments associated with the respective zones and/or based on specific routes from any given location to a delivery address. For example, if an item is being delivered from a fulfillment center or sort center within a zone to a delivery location in the same zone, the delivery time may be the same regardless of where the delivery location, fulfillment center location, or sort center location may be within the zone. The estimated time may be more granular in that the delivery time may be estimated based on a specific route even if routes originate from the same zone. Delivery time relationships may be specified for given regions. For example, if an item is being delivered from a location in one zone to another zone, the delivery time may be specified so that any delivery between the zones is estimated to be at the same time.

The electronic purchasing system associated with the one or more servers 210 may determine at a given time the delivery times for the same and different zones. When the electronic purchasing system receives a user purchase request, the electronic purchasing system may consider which estimated delivery time as determined and stored in the one or more servers 210 may provide the shortest guaranteed delivery time to present to the device 212 as an estimated delivery date/time.

The electronic purchasing system associated with the one or more servers 210 may use one or more machine learning algorithms (e.g., artificial intelligence algorithms) to determine optimal routes for delivery and estimated delivery times. The machine learning may be based on historical data associated with delivery times, driving routes, and other factors affecting the time taken to deliver items to particular locations/zones. Optimal routes may consider delivery time and cost.

The one or more servers may communicate with the fulfillment centers and sort centers using communication links 220, and may communicate with the device 212 using communication links 230. The communications links may be wireless or wired. The communication links may include any one of a combination of different types of suitable communications networks such as, for example, broadcasting networks, cable networks, public networks (e.g., the Internet), private networks, wireless networks, cellular networks, or any other suitable private and/or public networks. Further, the communications links may have any suitable communication range associated therewith and may include, for example, global networks (e.g., the Internet), metropolitan area networks (MANs), wide area networks (WANs), local area networks (LANs), or personal area networks (PANs). In addition, the communications links may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The location data for virtual fulfillment centers (e.g., vehicles) may be tracked using a Global Navigation Satellite System (GNSS) or other location tracking (e.g., global positioning data, which may be provided by devices associated with the virtual fulfillment centers, drivers or passengers associated with the virtual fulfillment centers, or data provided by drivers or passengers of the virtual fulfillment centers indicating the location of respective virtual fulfillment centers at any given time.

Figure 3:
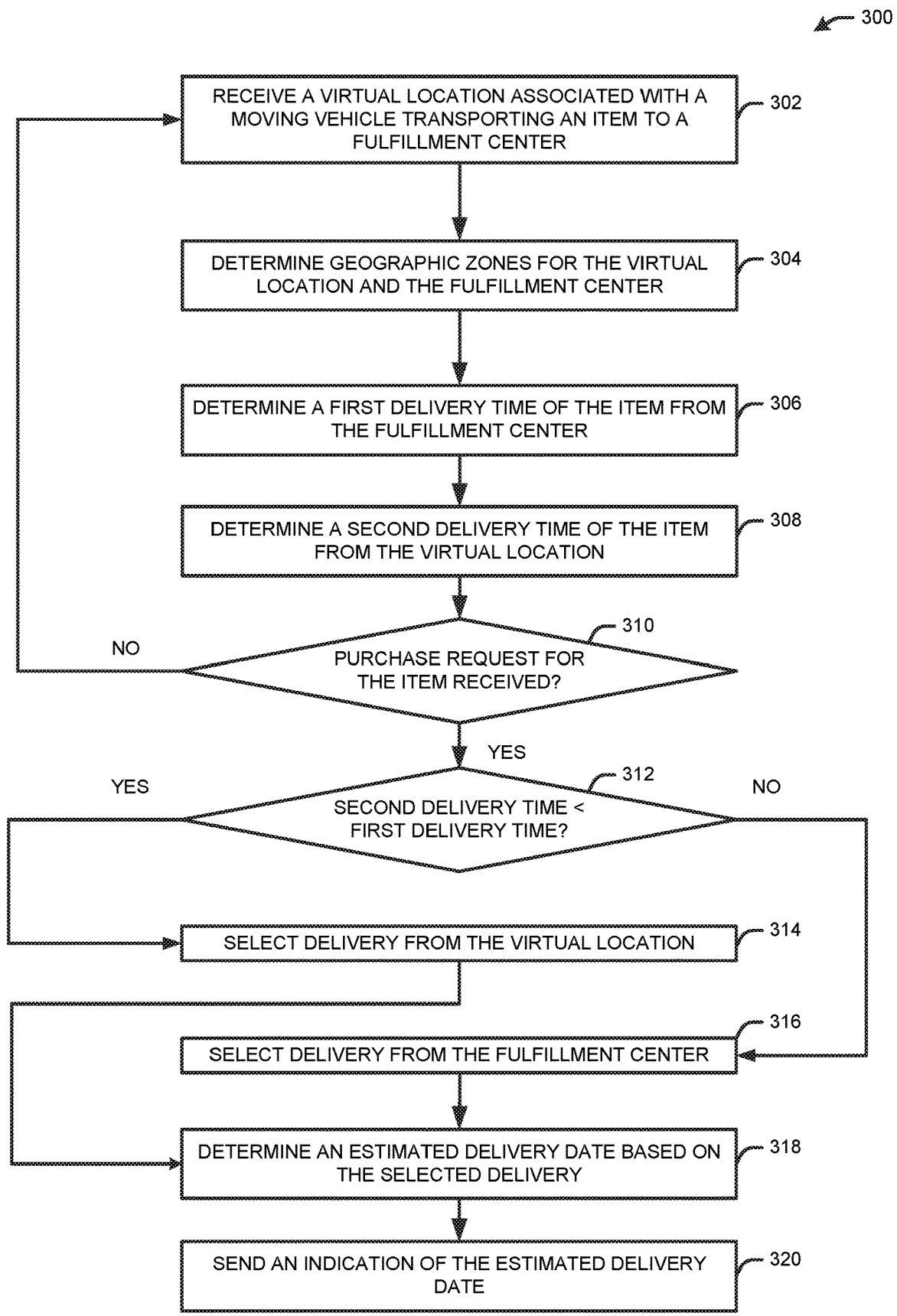
FIG. 3 illustrates a flow diagram for a process for determining optimal delivery based on virtual locations, in accordance with one or more example embodiments of the present disclosure.

FIG. 3 illustrates a flow diagram for a process 300 for determining optimal delivery based on virtual locations, in accordance with one or more example embodiments of the present disclosure.

At block 302, processing circuitry of a device (e.g., the one or more servers 210 of FIG. 2) may receive a virtual location associated with a moving vehicle (e.g., virtual fulfillment center 206A of FIG. 2) transporting an item (e.g., item 103 of FIG. 2) to a physical fulfillment center (e.g., physical fulfillment center 202A of FIG. 2). The moving vehicle's location may be a virtual location updated at any time and provided to the device (e.g., using Global Positioning System coordinates or user inputs). The vehicle may have picked up the item from another location (e.g., an address of a person returning the item). Rather than the item being considered unavailable for purchase using an electronic purchasing system, the item may be considered available for purchase, and to provide an estimated delivery date/time, the virtual location of the moving vehicle may be considered at any given time before the item has been logged at a physical fulfillment center or some other static location.

At block 304, the processing circuitry of the device may determine a geographic area/zone (e.g., zip code, pin-code, etc.) for the virtual location (and any other virtual locations associated with transporting the item), and for any physical fulfillment center locations within the same geographic area/zone of virtual locations. The physical fulfillment center locations and locations of sort centers (e.g., sort center 204A, sort center 204B of FIG. 2) may be known for a given geographic area/zone, so once the geographic area/zone of a virtual location has been determined, the device may identify the corresponding physical locations of fulfillment and/or sort centers. Virtual fulfillment centers may be mapped to a particular zone based on the virtual location of the vehicle representing the virtual fulfillment center. Virtual and physical locations where an item may be available for purchase may be identified in multiple geographic areas/zones so that when an item is selected by a purchaser, the device may determine the closest items to the delivery address of the purchaser, may determine the estimated delivery date/time, and may select which item to deliver (e.g., the item being transported by a virtual fulfillment center or the item at the physical fulfillment center).

At block 306, the device may determine a delivery time of an item from a fulfillment center. For any item available for purchase using an electronic purchasing system, the device may keep track of the item locations at any given time. This way, when a user indicates a purchase request and delivery address, the device may determine which item to deliver and the estimated delivery date/time to provide to the purchaser. The estimated delivery time may be based on the geographic area/zone in which an item may be located. For example, if an item is currently available in one geographic area/zone (e.g., zone 1 of FIG. 2), and the delivery address is in the same zone, then the delivery time may be estimated to be a set number of days or hours for any delivery within the same zone. If the delivery address is in a different zone (e.g., zone 2 of FIG. 2), the delivery time may be set based on an estimated delivery from zone 1 to zone 2. Zones may be different sizes, so delivery times from one location to another within zone 1 may not be the same as delivery times from one location to another within zone 2. The delivery times associated with different zones may be updated (e.g., using a machine-learning algorithm) which may consider travel/transportation data associated with deliveries to identify how long deliveries take between certain locations, optimal routes for deliveries, etc.

At block 308, the device may determine a delivery time of an item from one or more virtual locations. Rather than considering items in transportation to a physical fulfillment center or sort center to be unavailable for purchase (e.g., out of stock), the device may consider such items as available for purchase and may provide such indications to an application associated with the electronic purchasing system so that prospective purchasers may have access to more products. To provide purchasers with an accurate estimated delivery time/date, the virtual location of transported items may be determined by the device. The device may determine a delivery time for an item from a virtual fulfillment center by determining the time to return the item to a physical fulfillment center or sort center in a geographic area/zone, or to delivery within a geographic area/zone without having to return the item to a static location. For example, if a delivery address is in a zone (e.g., zone 1 of FIG. 2) where a requested item is not in stock at a physical fulfillment center (e.g., physical fulfillment center 202A of FIG. 2), rather than having to deliver the item from a physical fulfillment center in another zone (e.g., physical fulfillment center 202B of zone 2 of FIG. 2), the device may determine that the item is available from a virtual fulfillment center (e.g., virtual fulfillment center 206A of FIG. 2) in the same zone as the delivery location, and that delivery from within the same zone is faster than delivery from another zone. If a delivery address has multiple delivery options available from multiple different zones, then the fastest delivery time between zones may be used to select which item to deliver from a particular location, and to provide an estimated delivery time/date to a purchaser.

At block 310, the device may determine when a purchase request for an item is received. The device periodically may update location and availability information associated with items to maintain an accurate inventory of available items and their estimated delivery times. If no purchase request has been received, then the device may continue to block 302 to receive updated location data. Once a purchase request has been received, the device may continue to block 312 of the process 300. The indication of a purchase request may be received from a user device (e.g., device 212 of FIG. 2) on which the electronic purchasing system may operate. For example, a user device may present purchasing options in an electronic system/catalog hosted by an application. A user may select, via a user interface on the user device for example, items for purchase. When an item has been selected for purchase, the device may be notified by the user device of the purchase details, including the item and a delivery address for the purchaser.

At block 312, the device may compare the delivery times of available item locations and determine whether the delivery time of an item from a virtual fulfillment center is less than the delivery time of a physical fulfillment center. If the delivery times of physical and virtual fulfillment centers are the same (e.g., the physical and virtual fulfillment centers are located in the same zone), then a default shipping location may be used (e.g., the default may be to ship from the physical fulfillment center). If the delivery time of the virtual fulfillment center is not shorter than available deliveries from physical fulfillment centers, then the process 300 may continue to block 316. If the virtual fulfillment center provides the shortest/most efficient delivery time, then the process may continue to block 314.

At block 314, the device may select the item from the virtual location for delivery. The device may determine that delivery from the virtual fulfillment center is the most efficient and may allow for the fastest guaranteed delivery to a user, so the device may instruct the electronic purchasing system and/or the virtual fulfillment center to deliver the item to the delivery address of the purchaser by sending instructions to the virtual fulfillment center. The instructions may include delivering the item directly from the virtual fulfillment center or to deliver the item to another location (e.g., a physical fulfillment center or sort center), and for delivery to the delivery location from that location. For example, it may be faster to deliver the item from the virtual fulfillment center to a sort center than to a physical fulfillment center, and then deliver the item from the sort center to the delivery address. If a delivery location is in a zone where the item is not available at a physical fulfillment center, then the virtual fulfillment center may be directed to deliver the item directly or to deliver the item to physical fulfillment center or sort center, and then the device may direct another vehicle to deliver the item from the physical location.

At block 316, the device may select delivery from the physical fulfillment center. The device may determine that delivery from the physical fulfillment center is at least as efficient as delivery from a virtual fulfillment center and may allow for the fastest guaranteed delivery to a user, so the device may instruct the electronic purchasing system and/or the physical fulfillment center to deliver the item to the delivery address of the purchaser by sending instructions to the physical fulfillment center. The instructions may include delivering the item directly from the physical fulfillment center or to deliver the item to another location (e.g., a physical fulfillment center or sort center), and for delivery to the delivery location from that location. If a delivery location is in a zone where the item is not available at a physical fulfillment center, then a physical fulfillment center in another zone may be directed to deliver the item directly or to deliver the item to physical fulfillment center or sort center in a different zone, and then the device may direct another vehicle to deliver the item from the physical location.

At block 318, the device may determine an estimated delivery time/date based on the selected delivery. The delivery time/date may be based on the delivery location and the location of the virtual fulfillment center or physical fulfillment center from which the item is being delivered. If the delivery will occur with the same zone, the delivery time may be a set time for that zone. If the delivery will occur across zones, then the delivery time may be based on a set delivery time for the corresponding zones (e.g., a set time to deliver from zone 1 to zone 2 in FIG. 2). The delivery times may be based on collected delivery data indicating how long deliveries have taken in respective zones. Over time, the delivery times for zones may be adjusted based on how long deliveries have taken in the zones. The device may determine optimal routes between locations, and based on collected data regarding the travel time and cost using those routes, the device may update delivery time and cost estimations.

At block 320, the device may send an indication of the estimated delivery time/date to a purchaser. For example, if the purchaser has requested purchase of an item using a user device (e.g., device 212 of FIG. 2), the device may send the estimated delivery time/date to the user device to be displayed. The device therefore may cause the display of the estimated delivery time/date. This way, the user may be informed of an estimated delivery time/date, which may encourage a user to make a purchase and/or may provide the purchaser with satisfying information regarding when the purchased item may be delivered. If an item is not available at a fulfillment center, the purchaser may still see that an item is available for purchase because the device may have determined that the item is available from a virtual fulfillment center. Rather than indicate that the item is not in stock or cannot be guaranteed to be delivered within any time, the device may provide an accurate estimate of the delivery time to the purchaser at least because of the use of virtual locations of virtual fulfillment centers.

Figure 4:
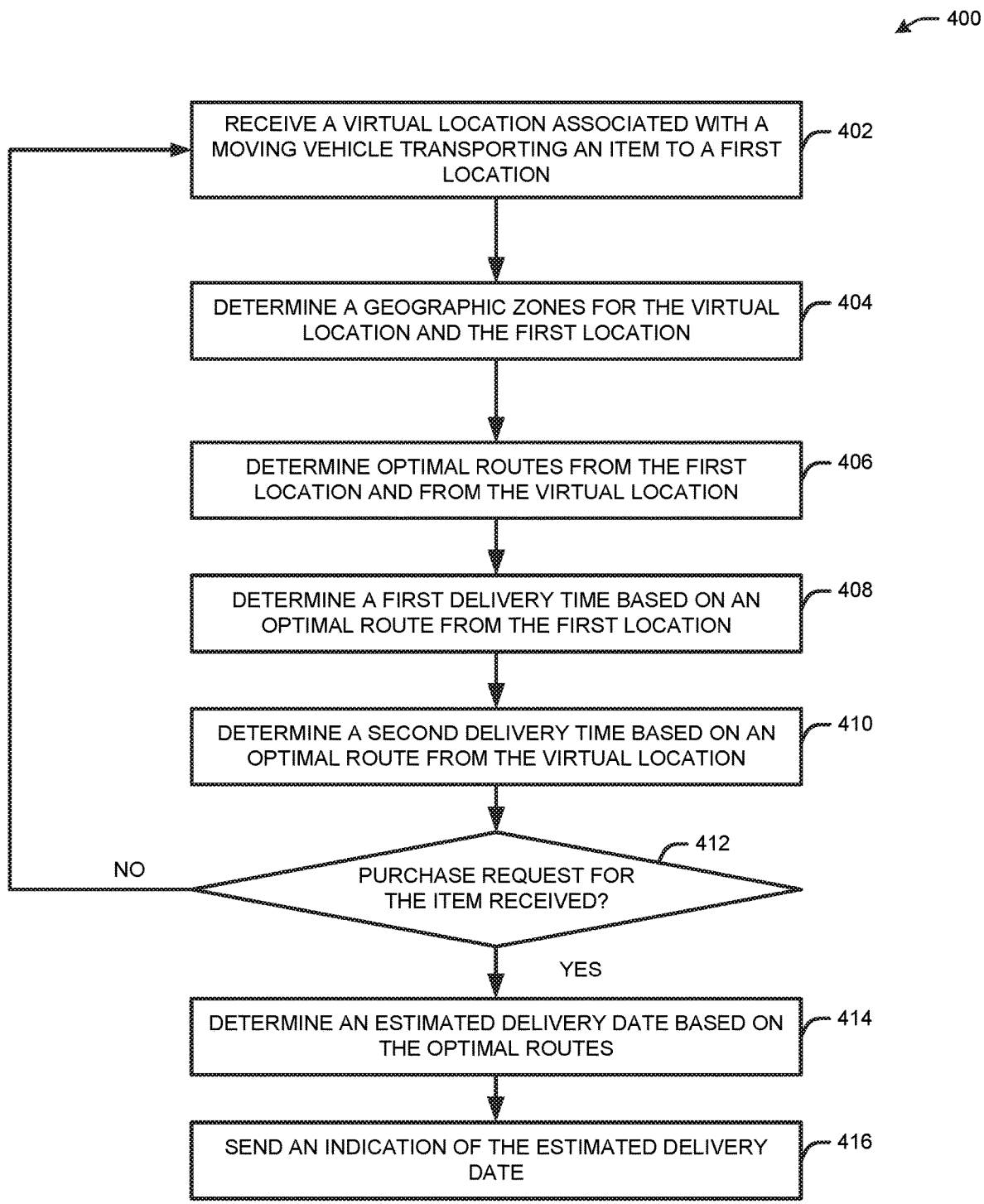
FIG. 4 illustrates a flow diagram for a process for determining optimal delivery based on virtual locations, in accordance with one or more example embodiments of the present disclosure.

FIG. 4 illustrates a flow diagram for a process 400 for determining optimal delivery based on virtual locations, in accordance with one or more example embodiments of the present disclosure.

At block 402, processing circuitry of a device (e.g., the one or more servers 210 of FIG. 2) may receive a virtual location associated with a moving vehicle (e.g., virtual fulfillment center 206A of FIG. 2) transporting an item (e.g., item 103 of FIG. 2) to a physical fulfillment center (e.g., physical fulfillment center 202A of FIG. 2). The moving vehicle's location may be a virtual location updated at any time and provided to the device (e.g., using Global Positioning System coordinates or user inputs). The vehicle may have picked up the item from another location (e.g., an address of a person returning the item). Rather than the item being considered unavailable for purchase using an electronic purchasing system, the item may be considered available for purchase, and to provide an estimated delivery date/time, the virtual location of the moving vehicle may be considered at any given time before the item has been logged at a physical fulfillment center or some other static location.

At block 404, the processing circuitry of the device may determine a geographic area/zone (e.g., zip code, pin-code, etc.) for the virtual location (and any other virtual locations associated with transporting the item), and for any physical fulfillment center locations within the same geographic area/zone of virtual locations. The physical fulfillment center locations and locations of delivery centers/sort centers (e.g., sort center 204A, sort center 204B of FIG. 2) may be known for a given geographic area/zone, so once the geographic area/zone of a virtual location has been determined, the device may identify the corresponding physical locations of fulfillment and/or delivery/sort centers. Virtual fulfillment centers may be mapped to a particular zone based on the virtual location of the vehicle representing the virtual fulfillment center. Virtual and physical locations where an item may be available for purchase may be identified in multiple geographic areas/zones so that when an item is selected by a purchaser, the device may determine the closest items to the delivery address of the purchaser, may determine the estimated delivery date/time, and may select which item to deliver (e.g., the item being transported by a virtual fulfillment center or the item at the physical fulfillment center).

At block 406, the processing circuitry of the device may determine optimal routes from physical locations and from the virtual fulfillment centers. To determine the estimated delivery times, optimal routes from the respective locations may be determined to the delivery location, and the shortest, fastest, and/or most cost-efficient (e.g., the lowest cost) route may be selected. If an item may be delivered from multiple fulfillment centers in the same geographic area/zone, then the estimated delivery times from each respective fulfillment center may be based on the individual routes, or may be considered the same time duration. The device may use one or more machine learning algorithms (e.g., artificial intelligence algorithms) to determine optimal routes for delivery and estimated delivery times. The machine learning may be based on historical data associated with delivery times, driving routes, and other factors affecting the time taken to deliver items to particular locations/zones.

At block 408, the processing circuitry of the device may determine a delivery time based on an optimal route from the physical location. For example, using historical delivery data, the device may update the estimated delivery time from a given fulfillment center to delivery locations within the same zone or deliveries to different zones. Based on the location of the fulfillment center (e.g., which zone the fulfillment center is in), the device may estimate delivery times for deliveries in the same zone or to different zones.

At block 410, the processing circuitry of the device may determine a delivery time based on an optimal route from the virtual location. For example, using historical delivery data, the device may update the estimated delivery times to delivery locations within the same zone or deliveries to different zones. Based on the location of the virtual fulfillment center (e.g., which zone the virtual fulfillment center is in), the device may estimate delivery times for deliveries in the same zone or to different zones.

At block 412, the device may determine when a purchase request for an item is received. The device periodically may update location and availability information associated with items to maintain an accurate inventory of available items and their estimated delivery times.

If no purchase request has been received, then the device may continue to block 402 to receive updated location data. Once a purchase request has been received, the device may continue to block 414 of the process 400. The indication of a purchase request may be received from a user device (e.g., device 212 of FIG. 2) on which the electronic purchasing system may operate. For example, a user device may present purchasing options in an electronic system/catalog hosted by an application. A user may select, via a user interface on the user device for example, items for purchase. When an item has been selected for purchase, the device may be notified by the user device of the purchase details, including the item and a delivery address for the purchaser.

At block 414, the device may determine an estimated delivery time/date based on the selected delivery and the delivery times associated with the optimal routes from the starting location to the delivery location (e.g., within a same zone or to a different zone). The delivery time/date may be based on the delivery location and the location of the virtual fulfillment center or physical fulfillment center from which the item is being delivered. If the delivery will occur with the same zone, the delivery time may be a set time for that zone. If the delivery will occur across zones, then the delivery time may be based on a set delivery time for the corresponding zones (e.g., a set time to deliver from zone 1 to zone 2 in FIG. 2). The delivery times may be based on collected delivery data indicating how long deliveries have taken in respective zones. Over time, the delivery times for zones may be adjusted based on how long deliveries have taken in the zones. The device may determine optimal routes between locations, and based on collected data regarding the travel time using those routes, the device may update delivery time estimations.

At block 416, the device may send an indication of the estimated delivery time/date to a purchaser. For example, if the purchaser has requested purchase of an item using a user device (e.g., device 212 of FIG. 2), the device may send the estimated delivery time/date to the user device to be displayed. The device therefore may cause the display of the estimated delivery time/date. This way, the user may be informed of an estimated delivery time/date, which may encourage a user to make a purchase and/or may provide the purchaser with satisfying information regarding when the purchased item may be delivered. If an item is not available at a fulfillment center, the purchaser may still see that an item is available for purchase because the device may have determined that the item is available from a virtual fulfillment center. Rather than indicate that the item is not in stock or cannot be guaranteed to be delivered within any time, the device may provide an accurate estimate of the delivery time to the purchaser at least because of the use of virtual locations of virtual fulfillment centers.

Figure 5:
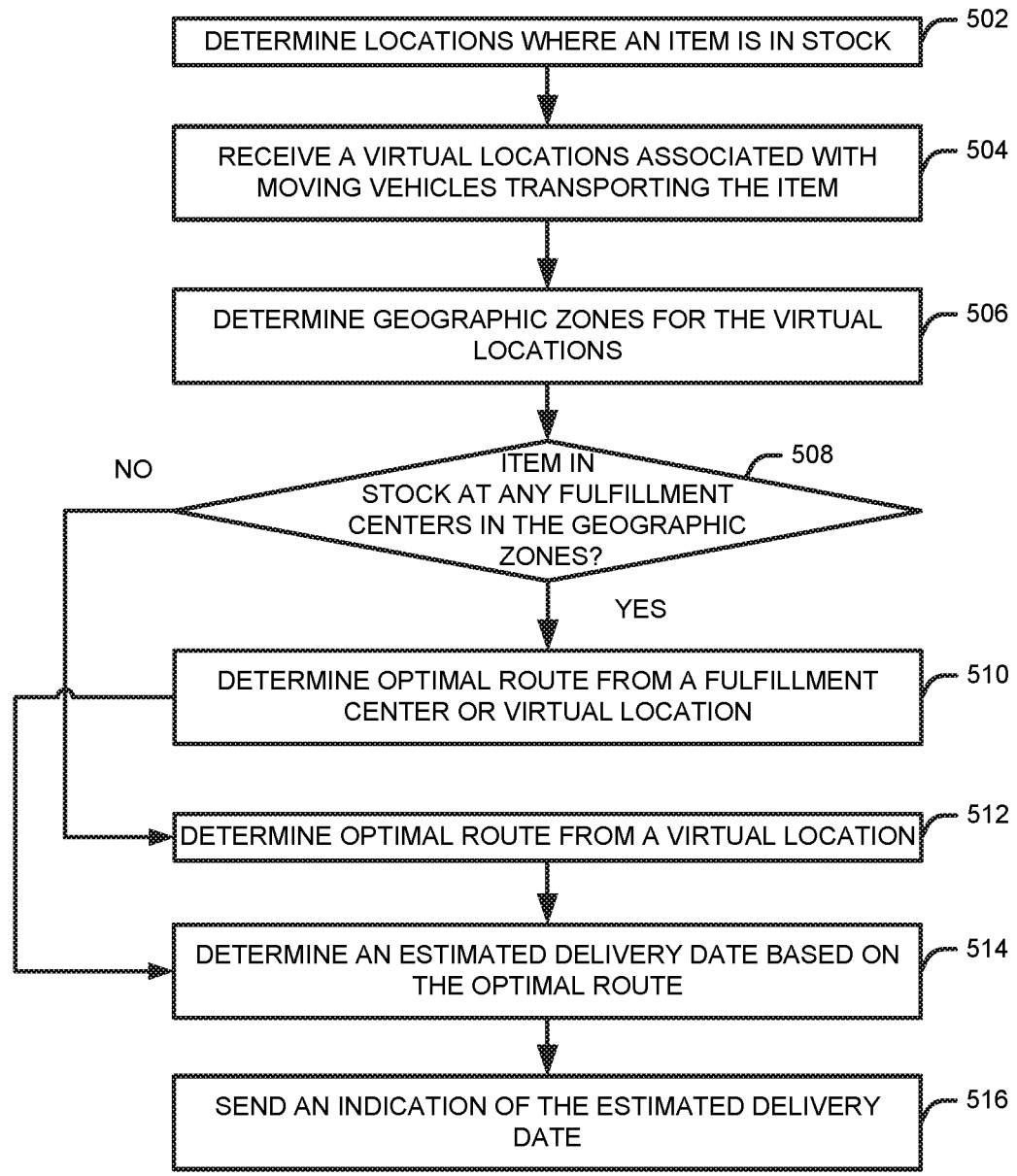
FIG. 5 illustrates a flow diagram for a process for determining optimal delivery based on virtual locations, in accordance with one or more example embodiments of the present disclosure.

FIG. 5 illustrates a flow diagram for a process 500 for determining optimal delivery based on virtual locations, in accordance with one or more example embodiments of the present disclosure.

At block 502, processing circuitry of a device (e.g., the one or more servers 210 of FIG. 2) may determine locations where an item may be in stock (e.g., available for purchase). For example, an item may be available for purchase from many locations, such as physical fulfillment centers (e.g., physical fulfillment center 202A of FIG. 2) in different geographic areas/zones (e.g., zone 1 of FIG. 2), virtual fulfillment centers (e.g., virtual fulfillment center 206A of FIG. 2) in different geographic areas/zones, and delivery/sort centers (e.g., sort center 204A, sort center 204B of FIG. 2) in different geographic areas/zones. An item not logged or in stock at a physical fulfillment center may be considered in stock/available for purchase when located at a virtual fulfillment center. The virtual fulfillment center may refer to a moving vehicle, such as a delivery vehicle.

At block 504, the processing circuitry of the device may determine the virtual locations of the virtual fulfillment centers. A moving vehicle's location may be a virtual location updated at any time and provided to the device (e.g., using Global Positioning System coordinates or user inputs). The vehicle may have picked up the item from another location (e.g., an address of a person returning the item). Rather than the item being considered unavailable for purchase using an electronic purchasing system, the item may be considered available for purchase, and to provide an estimated delivery date/time, the virtual location of the moving vehicle may be considered at any given time before the item has been logged at a physical fulfillment center or some other static location.

At block 506, the processing circuitry of the device may determine a geographic area/zone (e.g., zip code, pin-code, etc.) for the virtual location (and any other virtual locations associated with transporting the item). Once the geographic area/zone of a virtual location has been determined, the device may identify the corresponding physical locations of fulfillment and/or sort centers. Virtual fulfillment centers may be mapped to a particular zone based on the virtual location of the vehicle representing the virtual fulfillment center. Virtual and physical locations where an item may be available for purchase may be identified in multiple geographic areas/zones so that when an item is selected by a purchaser, the device may determine the closest items to the delivery address of the purchaser, may determine the estimated delivery date/time, and may select which item to deliver (e.g., the item being transported by a virtual fulfillment center or the item at the physical fulfillment center).

At block 508, the processing circuitry of the device may determine whether an item is in stock at any physical fulfillment centers. For example, if an item is available for purchase and delivery from a virtual fulfillment center in a geographic area/zone, but is not available at a physical fulfillment center, then a purchase request to deliver the item to a delivery location in that geographic area/zone may default to delivery from the virtual fulfillment center. If an item is in stock at a physical fulfillment center, the process 500 may continue to block 510. Otherwise, the process 500 may proceed to block 512.

At block 510, the processing circuitry of the device may determine optimal routes from both the physical fulfillment centers and virtual fulfillment centers in a given geographic area/zone. The optimal routes may be determined based on historical delivery data to identify the most time and/or cost efficient delivery routes for delivering an item within a given geographic area/zone, or from a given geographic area/zone to another geographic area/zone.

At block 512, the processing circuitry of the device may determine optimal routes from both the virtual fulfillment centers in a given geographic area/zone when an item is not available from a physical fulfillment center. The optimal routes may be determined based on historical delivery data to identify the most time and/or cost efficient delivery routes for delivering an item within a given geographic area/zone, or from a given geographic area/zone to another geographic area/zone. The optimal routes may be associated with the item to calculate how long the delivery time may be for the item to be delivered to a geographic area/zone.

At block 514, the processing circuitry of the device may determine a delivery time based on an optimal route from the physical location or virtual location. For example, using historical delivery data, the device may update the estimated delivery time from a given fulfillment center to delivery locations within the same zone or deliveries to different zones. Based on the location of the fulfillment center (e.g., which zone the fulfillment center is in), the device may estimate delivery times for deliveries in the same zone or to different zones. When the device receives an indication of a purchase request for the item, the device may select the shortest estimated delivery time based on the estimated delivery times determined for the item from available fulfillment centers.

At block 516, the device may send an indication of the estimated delivery time/date to a purchaser. For example, if the purchaser has requested purchase of an item using a user device (e.g., device 212 of FIG. 2), the device may send the estimated delivery time/date to the user device to be displayed. The device therefore may cause the display of the estimated delivery time/date. This way, the user may be informed of an estimated delivery time/date, which may encourage a user to make a purchase and/or may provide the purchaser with satisfying information regarding when the purchased item may be delivered. If an item is not available at a fulfillment center, the purchaser may still see that an item is available for purchase because the device may have determined that the item is available from a virtual fulfillment center. Rather than indicate that the item is not in stock or cannot be guaranteed to be delivered within any time, the device may provide an accurate estimate of the delivery time to the purchaser at least because of the use of virtual locations of virtual fulfillment centers.

Figure 6:
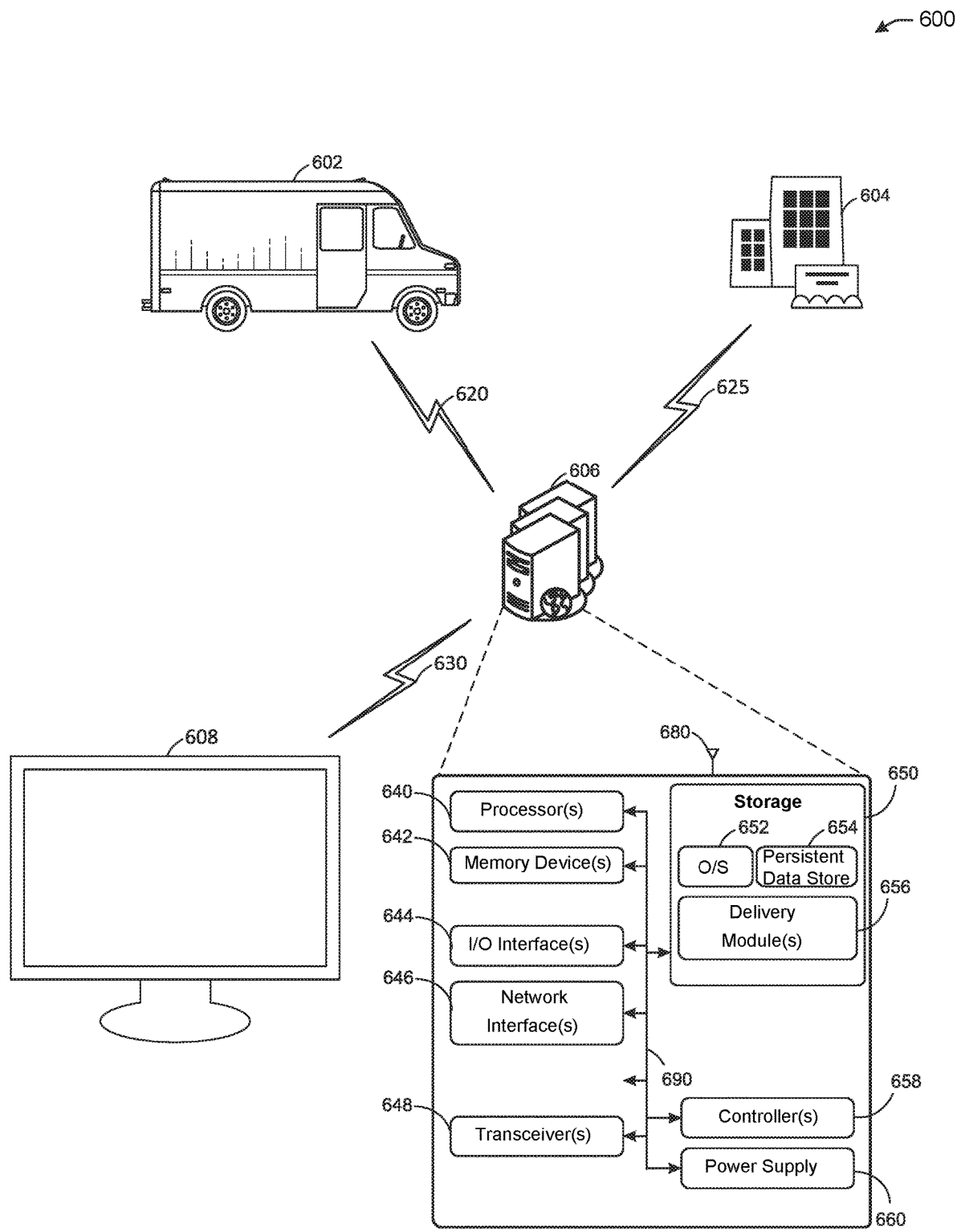
FIG. 6 illustrates a system for determining optimal delivery based on virtual locations, in accordance with one or more example embodiments of the present disclosure.

FIG. 6 illustrates a system 600 for determining optimal delivery based on virtual locations, in accordance with one or more example embodiments of the present disclosure.

The system may be a virtual fulfillment center system having one or more virtual fulfillment centers (e.g., virtual fulfillment center 602), one or more physical fulfillment centers (e.g., physical fulfillment center 604), one or more servers 606 in communication with the virtual and physical fulfillment centers or people associated with the virtual and physical fulfillment centers, and one or more user devices (e.g., device 608) in communication with the one or more servers 606 to facilitate/execute an electronic purchasing system facilitated by the one or more servers 606 (e.g. the user devices may present user interfaces in an application showing available items for purchase, allowing users to select items for purchase, facilitating purchase of items, presenting purchase details such as estimated delivery dates/times, etc.). The one or more servers 606 may communicate with the one or more virtual fulfillment centers using communication links 620, may communicate with the one or more physical fulfillment centers using communication links 625, and may communicate with the one or more user devices using communication links 630.

The communications links may be wireless or wired. The communication links may include any one of a combination of different types of suitable communications networks such as, for example, broadcasting networks, cable networks, public networks (e.g., the Internet), private networks, wireless networks, cellular networks, or any other suitable private and/or public networks. Further, the communications links may have any suitable communication range associated therewith and may include, for example, global networks (e.g., the Internet), metropolitan area networks (MANs), wide area networks (WANs), local area networks (LANs), or personal area networks (PANs). In addition, the communications links may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more servers 606 may include one or more hardware/software components. For example, the one or more servers 606 may include one or more processors 640, one or more memory devices 642, one or more input/output interfaces 644, one or more network interfaces 646, one or more transceivers 648, storage 650 (e.g., which may store one or more operating systems 652, one or more persistent data stores 654 (e.g., a database management systems), and one or more delivery modules 656), one or more controller 658, a power supply 660, one or more anntena(e) 680, and one or more bus(es) 690.

Referring to the components of the one or more servers 606, the storage 650 may include removable storage and/or non-removable storage including, but not limited to, magnetic storage, optical disk storage, and/or tape storage. The storage 650 may provide non-volatile storage of computer-executable instructions and other data. The storage 650, removable and/or non-removable, are an example of computer-readable storage media (CRSM) as that term is used herein.

The storage 650 may store computer-executable code, instructions, or the like that may be executable by the processing circuitry 640 to cause the processing circuitry 640 to perform or initiate various operations (e.g., operations associated with computer-executable instructions for the one or more delivery modules 656). The storage 650 may additionally store data that may be copied for use by the processing circuitry 640 during the execution of the computer-executable instructions. Moreover, output data generated as a result of execution of the computer-executable instructions by the processing circuitry 640 may be copied to the storage 650 for non-volatile storage.

The storage 650 may store one or more program module(s), applications, engines, computer-executable code, scripts, or the like. Some or all of these module(s) may be or include sub-module(s). Any of the components depicted as being stored in the storage 650 may include any combination of software, firmware, and/or hardware. The software and/or firmware may include computer-executable code, instructions, or the like that may executed by one or more of the processing circuitry 640. Any of the components depicted as being stored in the storage 380 may support the functionality described in reference to the corresponding components named earlier in this disclosure.

The storage 650 may further store various types of data utilized by the components of the one or more servers 606. Any data stored in the storage 650 may be used by the processing circuitry 640 in executing computer-executable code. In addition, any data depicted as being stored in the storage 650 may potentially be stored in one or more datastore(s). The datastore(s) may include, but are not limited to, databases (e.g., relational, object-oriented, etc.), file systems, flat files, distributed datastores in which data are stored on more than one node of a computer network, peer-to-peer network datastores, or the like.

The storage 650 may store the one or more delivery modules 656. The one or more delivery modules 656 may provide executable code for collecting location data, determining optimal routes, determining delivery times, providing available item data and delivery times, etc.

The processing circuitry 640 may be configured to access the storage 650 and execute the computer-executable instructions loaded therein. For example, the processing circuitry 640 may be configured to execute computer-executable instructions of the various program module(s), applications, engines, or the like of the one or more servers 606 to cause or facilitate various operations to be performed in accordance with one or more embodiments of the disclosure. The processing circuitry 640 may include any suitable processing unit capable of accepting data as input, processing the input data in accordance with stored computer-executable instructions, and generating output data. The processing circuitry 640 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 640 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 640 may be capable of supporting any of a variety of instruction sets.

The one or more servers 606 may further include one or more network interface(s) 646 via which the one or more servers 606 may communicate with any of a variety of other systems, platforms, networks, devices, and so forth. The network interface(s) 646 may enable communication, for example, with one or more wireless routers, one or more host servers, one or more web servers, and the like via one or more networks. The network interface(s) 646 may enable communication, for example, with one or more wireless routers, one or more host servers, one or more web servers, and the like via one or more networks.

The transceivers 648 may include any suitable type of transceiver depending, for example, on the communications protocols used to transmit or receive signals. The transceivers 648 may additionally, or alternatively, include a Wi-Fi transceiver configured to transmit or receive signals in accordance with established standards and protocols. The transceivers 648 may include any suitable radio component(s) for transmitting or receiving signals in a bandwidth and/or channels. The transceivers 648 may include any known receiver and baseband suitable for communicating via the communications protocols utilized by the one or more servers 606. The transceivers 648 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 6 as being stored in the storage 650 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the one or more servers 606, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the one or more servers 606 may include alternate and/or additional hardware, software, or firmware components beyond those described or depicted without departing from the scope of the disclosure. More particularly, it should be appreciated that software, firmware, or hardware components depicted as forming part of the one or more servers 606 are merely illustrative and that some components may not be present or additional components may be provided in various embodiments. While various illustrative program module(s) have been depicted and described as software module(s) stored in the storage 650, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s)

of another module, in certain embodiments, such module(s) may be provided as independent module(s) or as sub-module(s) of other module(s).

The one or more servers 606 may further include one or more buses 690 that functionally couple various components of the one or more servers 606. The bus(es) 690 may include at least one of a system bus, a memory bus, an address bus, or a message bus, and may permit the exchange of information (e.g., data (including computer-executable code), signaling, etc.) between various components of the one or more servers 606. The bus(es) 690 may include, without limitation, a memory bus or a memory controller, a peripheral bus, an accelerated graphics port, and so forth. The bus(es) 690 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The bus(es) 690 may include at least one of a system bus, a memory bus, an address bus, or a message bus, and may permit the exchange of information (e.g., data (including computer-executable code), signaling, etc.) between various components of the one or more servers 606. The bus(es) 690 may include, without limitation, a memory bus or a memory controller, a peripheral bus, an accelerated graphics port, and so forth. The bus(es) 690 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 642 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 642 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 642 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

More specifically, the storage 650 may store one or more operating systems (O/S) 652; one or more persistent data stores 654; and one or more program module(s), applications, engines, computer-executable code, scripts, or the like such as, for example, the one or more delivery modules 656. Some or all of these module(s) may be or include sub-module(s). Any of the components depicted as being stored in the storage 650 may include any combination of software, firmware, and/or hardware. The software and/or firmware may include computer-executable code, instructions, or the like that may be loaded into the memory 642 for execution by one or more of the processor(s) 640. Any of the components depicted as being stored in the storage 650 may support the functionality described in reference to the corresponding components named earlier in this disclosure.

The storage 650 may further store various types of data utilized by the components of the one or more servers 606. Any data stored in the storage 650 may be loaded into the memory 642 for use by the processor(s) 640 in executing computer-executable code. In addition, any data depicted as being stored in the storage 650 may potentially be stored in one or more datastore(s) and may be accessed via the one or more persistent data stores 654 and loaded in the memory 642 for use by the processor(s) 640 in executing computer-executable code.

Referring now to other illustrative components depicted as being stored in the storage 650, the O/S 652 may be loaded from the data storage 650 into the memory 642 and may provide an interface between other application software executing on the one or more servers 606. More specifically, the O/S 652 may include a set of computer-executable instructions for managing the hardware resources of the one or more servers 606 and for providing common services to other application programs (e.g., managing memory allocation among various application programs). In certain example embodiments, the O/S 652 may control execution of the other program module(s) to dynamically enhance characters for content rendering.

The one or more persistent data stores 654 may be loaded into the memory 642 and may support functionality for accessing, retrieving, storing, and/or manipulating data stored in the memory 642 and/or data stored in the storage 650. The one or more persistent data stores 654 may use any of a variety of database models (e.g., relational model, object model, etc.) and may support any of a variety of query languages. The one or more persistent data stores 654 may access data represented in one or more data schemas and stored in any suitable data repository including, but not limited to, databases (e.g., relational, object-oriented, etc.), file systems, flat files, distributed datastores in which data are stored on more than one node of a computer network, peer-to-peer network datastores, or the like.

Referring now to other illustrative components of the one or more servers 606, the input/output (I/O) interface(s) 644 may facilitate the receipt of input information by the one or more servers 606 from one or more I/O devices as well as the output of information from the one or more servers 606 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the one or more servers 606 or may be separate. The I/O devices may further include, for example, any number of peripheral devices such as data storage devices, printing devices, and so forth. The I/O interface(s) 644 may also include an interface for an external peripheral device connection such as HDMI, universal serial bus (USB), micro-USB, FireWire, Thunderbolt, Ethernet port or other connection protocol that may connect to one or more networks.

The controller(s) 658 may be any microcontroller or microprocessor configured to control one or more operations of the one or more servers 606. The power supply 660 may be a battery, such as a lithium-ion battery. The power supply 660 may be provided power from a power receptacle or other power charging device.

The one or more servers 606 may optionally include one or more antenna(e) 680 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   identifying, by a first device, a return of an item from a purchaser of the item to a fulfillment center location;
   generating, by the first device, a first inventory for the item at a first time prior to the return, the first inventory comprising items that have not been previously purchased, items at a fulfillment center, and items in moving vehicles, the item absent from the first inventory at the first time;
   receiving, at the first device, based on the return, a dynamic location of a moving vehicle in which the item is located while in transportation from the purchaser to the fulfillment center location, wherein the fulfillment center location is located in a first geographic zone;
   generating, by the first device, based on the return, a virtual fulfillment center representing the moving vehicle and using the dynamic location during the transportation;
   adding, by the first device, based on the return and the generation of the virtual fulfillment center, the item and an indication of the virtual fulfillment center to the first inventory at a second time;
   determining, by the first device, based on the first inventory at the second time, a second geographic zone including the dynamic location, wherein the second geographic zone is different than the first geographic zone;
   receiving, by the first device from a second device, a request for the item;
   determining, by the first device, based on the first geographic zone and the request, prior to a confirmation that the item has been selected from among other items for addition to a shopping cart, a first delivery time associated with delivering the item from the fulfillment center location to a delivery location;
   determining, by the first device, based on the second geographic zone and the request, prior to the confirmation that the item has been selected from among other items for addition to the shopping cart, a second delivery time associated with delivering the item from the virtual fulfillment center to the delivery location;
   determining, by the first device, based on the first delivery time and the second delivery time, that the second delivery time is a shortest delivery time for the item from among the first inventory;
   selecting, by the first device, the item from the virtual fulfillment center;
   selecting the second delivery time as an estimated delivery date, instead of other delivery times for the item from among the first inventory, to the delivery location based on the second delivery time being the shortest delivery time;
   sending, to the second device, an indication of the estimated delivery date; and
   receiving, at the first device, the confirmation that the item has been selected for addition to the shopping cart based on the estimated delivery date.

2. The method of claim 1, further comprising determining a sort center location located in the second geographic zone, wherein the second delivery time is associated with delivery of the item from the virtual fulfillment center to the sort center location, and delivery of the item from the sort center location to the delivery location.

3. The method of claim 1, wherein the fulfillment center location is a first fulfillment center location, further comprising:
   determining a third geographic zone associated with a second fulfillment center location, the third geographic zone being different than the first geographic zone and the second geographic zone;
   determining a third delivery time associated with delivering the item from the virtual fulfillment center to the second fulfillment center location, and delivering the item from the second fulfillment center location to the delivery location; and
   determining that the second delivery time is less than the third delivery time.

4. The method of claim 1, wherein determining the second delivery time comprises:
   determining, using a machine learning algorithm, a route from the virtual fulfillment center to the delivery location, wherein the route is based in historical delivery data; and
   determining the second delivery time based on the route.

5. The method of claim 1, wherein the fulfillment center location is a first fulfillment center location, wherein the delivery location is located in a third geographic zone, wherein the third geographic zone is associated with a second fulfillment center location, wherein the item is not in stock at the second fulfillment center location, further comprising:
   determining a third delivery time associated with delivering the item from the virtual fulfillment center to the second fulfillment center location, and from the second fulfillment center location to the delivery location, wherein the second delivery time is not associated with the second fulfillment center location; and
   determining that the second delivery time is less than the third delivery time.

6. A method, comprising:
   identifying, by a first device, a return of an item from a purchaser of the item to a first location;
   generating, by the first device, a first inventory for the item at a first time prior to the return, the first inventory comprising items that have not been previously purchased, items at a fulfillment center, and items in moving vehicles, the item absent from the first inventory at the first time;
   receiving, at the first device, based on the return, a dynamic location of a vehicle where the item is located while in transportation from the purchaser to the first location;

generating, by the first device, based on the return, a virtual fulfillment center representing the vehicle and using the dynamic location during the transportation;

adding, by the first device, based on the return and the generation of the virtual fulfillment center, the item and an indication of the virtual fulfillment center to the first inventory at a second time;

determining, by the first device, based on the first inventory at the second time, a geographic zone including the dynamic location;

receiving, by the first device from a second device, a request for the item;

determining, by the first device, based on the purchase request, prior to a confirmation that the item has been selected from among other items for addition to a shopping cart, a first delivery time associated with delivering the item from the first location to a delivery location;

determining, by the first device, based on the geographic zone and the request, prior to the confirmation that the item has been selected from among other items for addition to the shopping cart, a second delivery time associated with delivering the item from the virtual fulfillment center to the delivery location;

determining, by the first device, based on the first delivery time and the second delivery time, that the second delivery time is a shortest delivery time for the item from among the first inventory;

selecting, by the first device, the second delivery time as an estimated delivery date, instead of other delivery times for the item from among the first inventory, to the delivery location based on the second delivery time being the shortest delivery time;

sending, to the second device, an indication of the estimated delivery date; and receiving, at the first device, the confirmation that the item has been selected for addition to the shopping cart based on the estimated delivery date.

7. The method of claim 6, further comprising determining a second location located in the geographic zone, wherein the second delivery time is further associated with delivering the item from the virtual fulfillment center to the second location, and delivering the item from the second location to the delivery location.

8. The method of claim 6, wherein the geographic zone is a first geographic zone, further comprising:
determining a second geographic zone associated with a second location, the second geographic zone being different than the first geographic zone;
determining a third delivery time associated with delivering the item from the virtual fulfillment center to the second location, and delivering the item from the second location to the delivery location; and
determining that the second delivery time is less than the first delivery time and the third delivery time.

9. The method of claim 6, wherein determining the second delivery time comprises:
determining, using a machine learning algorithm, a route from the virtual fulfillment center to the delivery location, wherein the route is based in historical delivery data; and
determining the second delivery time based on the route.

10. The method of claim 6, wherein the geographic zone is a first geographic zone, wherein the delivery location is located in a second geographic zone, wherein the second geographic zone is associated with a second location, wherein the item is not in stock at the second location, further comprising:
determining a third delivery time associated with delivering the item from the virtual fulfillment center to the second location, and from the second location to the delivery location, wherein the second delivery time is not associated with the second location; and
determining that the second delivery time is less than the first delivery time and the third delivery time.

11. The method of claim 6, wherein the geographic zone is a first geographic zone, wherein the delivery location is located in a second geographic zone, wherein the second geographic zone is associated with a second location, wherein the item is not in stock at the second location, further comprising:
determining a third delivery time associated with delivering the item from the virtual fulfillment center to the second location, and from the second location to the delivery location, wherein the second delivery time is not associated with the second location; and
determining that the first delivery time is less than the second delivery time and the third delivery time.

12. The method of claim 6, wherein the geographic zone is a first geographic zone, wherein the delivery location is located in a second geographic zone, wherein the second geographic zone is associated with a second location, wherein the item is not in stock at the second location, further comprising:
determining a third delivery time associated with delivering the item from the virtual fulfillment center to the second location, and from the second location to the delivery location, wherein the second delivery time is not associated with the second location; and
determining that the third delivery time is less than the second delivery time and the first delivery time.

13. The method of claim 6, further comprising:
determining that the second delivery time is less than the first delivery time; and
selecting the item from the virtual fulfillment center.

14. The method of claim 6, further comprising:
determining that the first delivery time is less than the second delivery time; and
selecting the item from the first location.

15. The method of claim 6, wherein the second delivery time is based on the dynamic location at the second time, the method further comprising:
determining, at a third time after the second time, that the dynamic location is within the geographic zone;
determining a third delivery time associated with delivering the item from the dynamic location at the third time; and
determining that the third delivery time is less than the first delivery time and the second delivery time, wherein the estimated delivery date is further based on the third delivery time.

16. A device comprising memory and at least one processor, the at least one processor configured to:
identify a return of an item from a purchaser of the item to a first location;
generate a first inventory for the item at a first time prior to the return, the first inventory comprising items that have not been previously purchased, items at a fulfillment center, and items in moving vehicles, the item absent from the first inventory at the first time;

receive, based on the return, a dynamic location of a vehicle where the item is located while in transportation from the purchaser to the first location;

generate, based on the return, a virtual fulfillment center representing the vehicle and using the dynamic location during the transportation;

add, based on the return and the generation of the virtual fulfillment center, the item and an indication of the virtual fulfillment center to the first inventory at a second time;

determine, based on the first inventory at the second time, a geographic zone including the dynamic location;

receive, from a second device, a request for the item;

determine, based on the request, prior to a confirmation that the item has been selected from among other items for addition to a shopping cart, a first delivery time associated with delivering the item from the first location to a delivery location;

determine, based on the request, prior to the confirmation that the item has been selected from among other items for addition to the shopping cart, a second delivery time associated with delivering the item from the virtual fulfillment center to the delivery location;

determine, based on the first delivery time and the second delivery time, that the second delivery time is a shortest delivery time for the item from among the first inventory;

select the second delivery time as an estimated delivery date, instead of other delivery times for the item from among the first inventory, to the delivery location based on the second delivery time being the shortest delivery time;

send, to the second device, an indication of the estimated delivery date; and receive the confirmation that the item has been selected for addition to the shopping cart based on the estimated delivery date.

17. The device of claim 16, wherein the at least one processor is further configured to determine a second location located in the geographic zone, wherein the second delivery time is associated with delivering the item from the virtual fulfillment center to the second location, and delivering the item from the second location to the delivery location.

18. The device of claim 16, wherein the geographic zone is a first geographic zone, wherein the at least one processor is further configured to:

determine a second geographic zone associated with a second location, the second geographic zone being different than the first geographic zone;

determine a third delivery time associated with delivering the item from the virtual fulfillment center to the second location, and delivering the item from the second location to the delivery location; and determine that the second delivery time is less than the first delivery time and the third delivery time.

19. The device of claim 16, wherein to determine the second delivery time comprises the at least one processor being further configured to:

determine, using a machine learning algorithm, a route from the virtual fulfillment center to the delivery location, wherein the route is based in historical delivery data; and determine the second delivery time based on the route.

20. The device of claim 16, wherein the geographic zone is a first geographic zone, wherein the delivery location is located in a second geographic zone, wherein the second geographic zone is associated with a second location, wherein the item is not in stock at the second location, wherein the at least one processor is further configured to:

determine a third delivery time associated with delivering the item from the virtual fulfillment center to the second location, and from the second location to the delivery location, wherein the second delivery time is not associated with the second location; and determine that the second delivery time is less than the first delivery time and the third delivery time.

\* \* \* \* \*

UNITED STATES PATENT AND TRADEMARK OFFICE
CERTIFICATE OF CORRECTION

| | |
|---|---|
| PATENT NO. | : 11,868,934 B1 |
| APPLICATION NO. | : 16/180467 |
| DATED | : January 9, 2024 |
| INVENTOR(S) | : Jayanta Mandal and Debasish Das |

It is certified that error appears in the above-identified patent and that said Letters Patent is hereby corrected as shown below:

In the Claims

Claim 6 at Column 25, Line 13, the word "purchase" should be deleted.

Signed and Sealed this
Fifth Day of March, 2024

Katherine Kelly Vidal
*Director of the United States Patent and Trademark Office*